Figure 1:
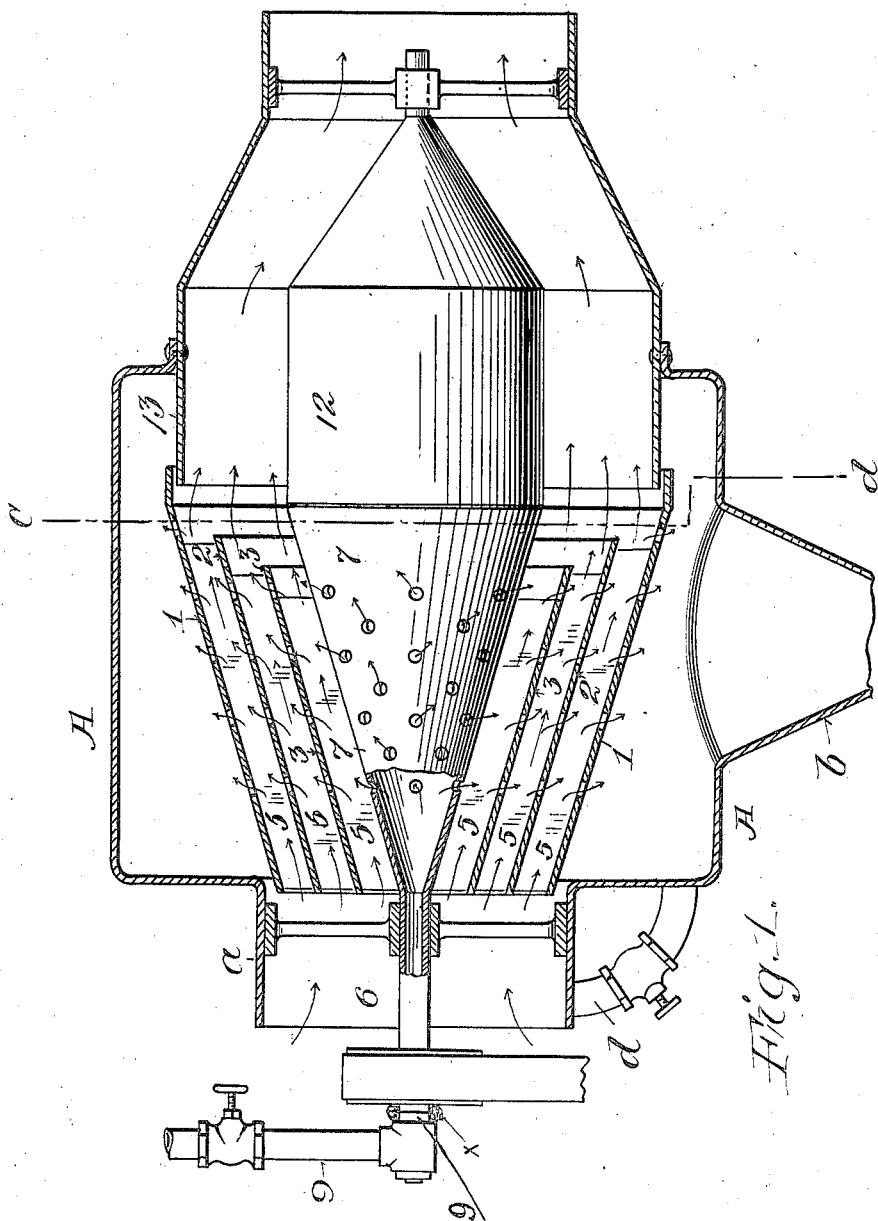

W. J. BALDWIN.
ART OF SEPARATING MATERIALS FROM GASES.
APPLICATION FILED NOV. 1, 1910.
1,057,613.
Patented Apr. 1, 1913.
3 SHEETS—SHEET 3.
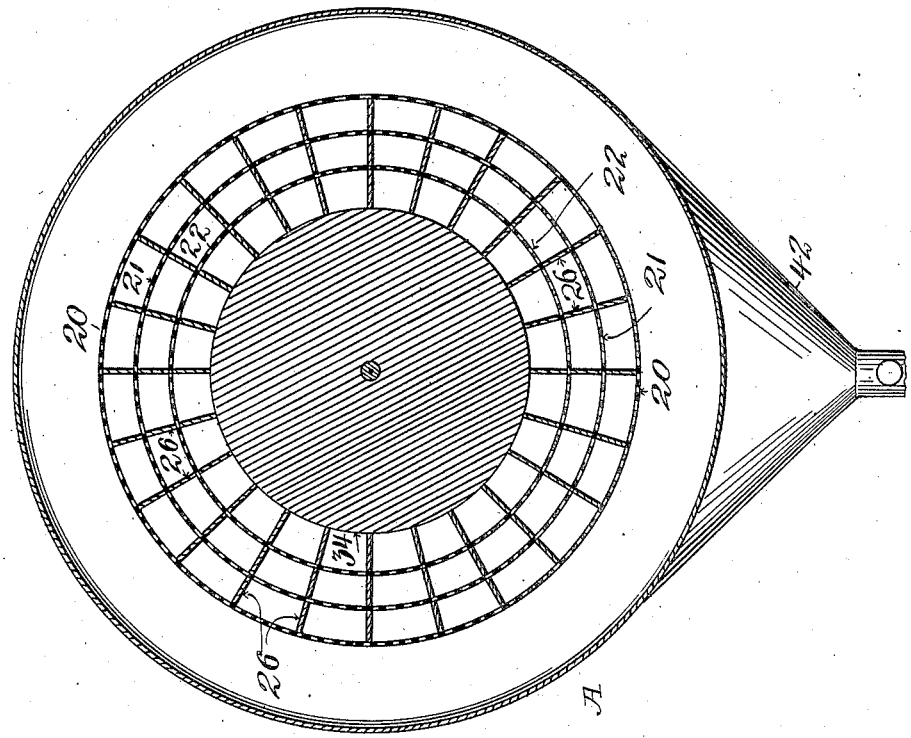
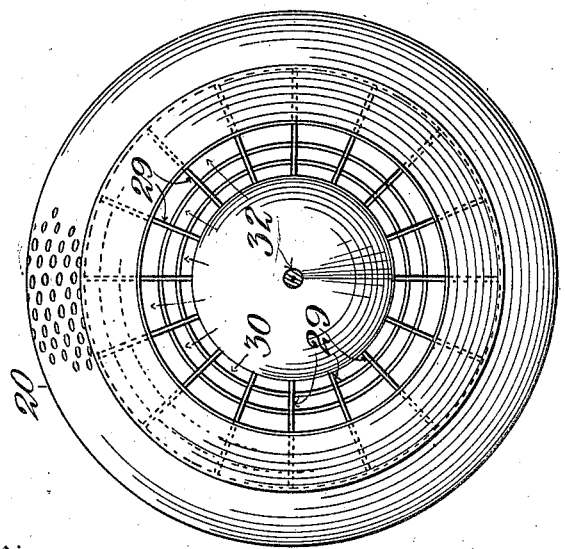

UNITED STATES PATENT OFFICE.

WILLIAM J. BALDWIN, OF BROOKLYN, NEW YORK.

ART OF SEPARATING MATERIALS FROM GASES.

1,057,613.   Specification of Letters Patent.   Patented Apr. 1, 1913.

Application filed November 1, 1910. Serial No. 590,235.

*To all whom it may concern:*

Be it known that I, WILLIAM J. BALDWIN, a citizen of the United States, and a resident of the borough of Brooklyn, in the county of Kings and State of New York, have invented certain new and useful Improvements in the Art of Separating Materials from Gases, of which the following is a specification.

This invention relates to improvements in the art of separating materials from gases, and includes both the process and the apparatus for applying the process.

In particular, the purpose of the invention is to obtain a high efficiency of separation by moistening the particles with water or any other suitable fluid, as suitable chemical reagents, which will bring even the finely divided particles into such condition that they are acted on by centrifugal force, and by subjecting the agglomerates which result from said wetting of the particles to the accelerating effect of rotary baskets, whereby great rotative velocity is imparted, or re-added, to the said agglomerates and they are thrown out of the gas, which term includes atmospheric air as well as any other gas, by this effective centrifugal force. It is further intended to use a fluid to condense volatile acids or other condensable constituents, held in air or other fixed gases, and to bring the agglomerated fluid and condensed vapor within the effective centrifugal force of the apparatus.

By this invention, moreover, the water or other fluid used to wet or condense or mix with the particles is thrown out across the path of the air or gas, and does not go along with it, and this is a point of much importance; for, by reason of this advantage, the invention furnishes dry air or gas, the water or other fluid which is used to wet or condense the particles being thrown out of the air or gas together with the mixture before said air or gas is delivered from the apparatus.

The invention is applicable to removing dust and other impurities from air for ventilating purposes; to condensing and removing acid or other condensable vapors and throwing them through the baskets as a fluid or semi-fluid; to removing saw-dust, flour-dust, marble-dust, and other fine particles from air of work shops; to removing the smoke particles from gases of combustion; to removing, condensing and recovering various substances, such as acids, formed in the course of various manufactures; and in general to separating any finely divided solid material or condensable gases or acids from any air or gas. Hereafter, for conciseness of description, I shall use the term "gas" to include all gas including atmospheric air, and the term "dust" to include all materials, whether solid or fluid, to be separated from the gas.

My invention may be applied by various apparatus, and I show several modifications of apparatus in the accompanying drawings, and hereinafter describe the same, without, however, intending to limit myself thereto.

Figure 2:
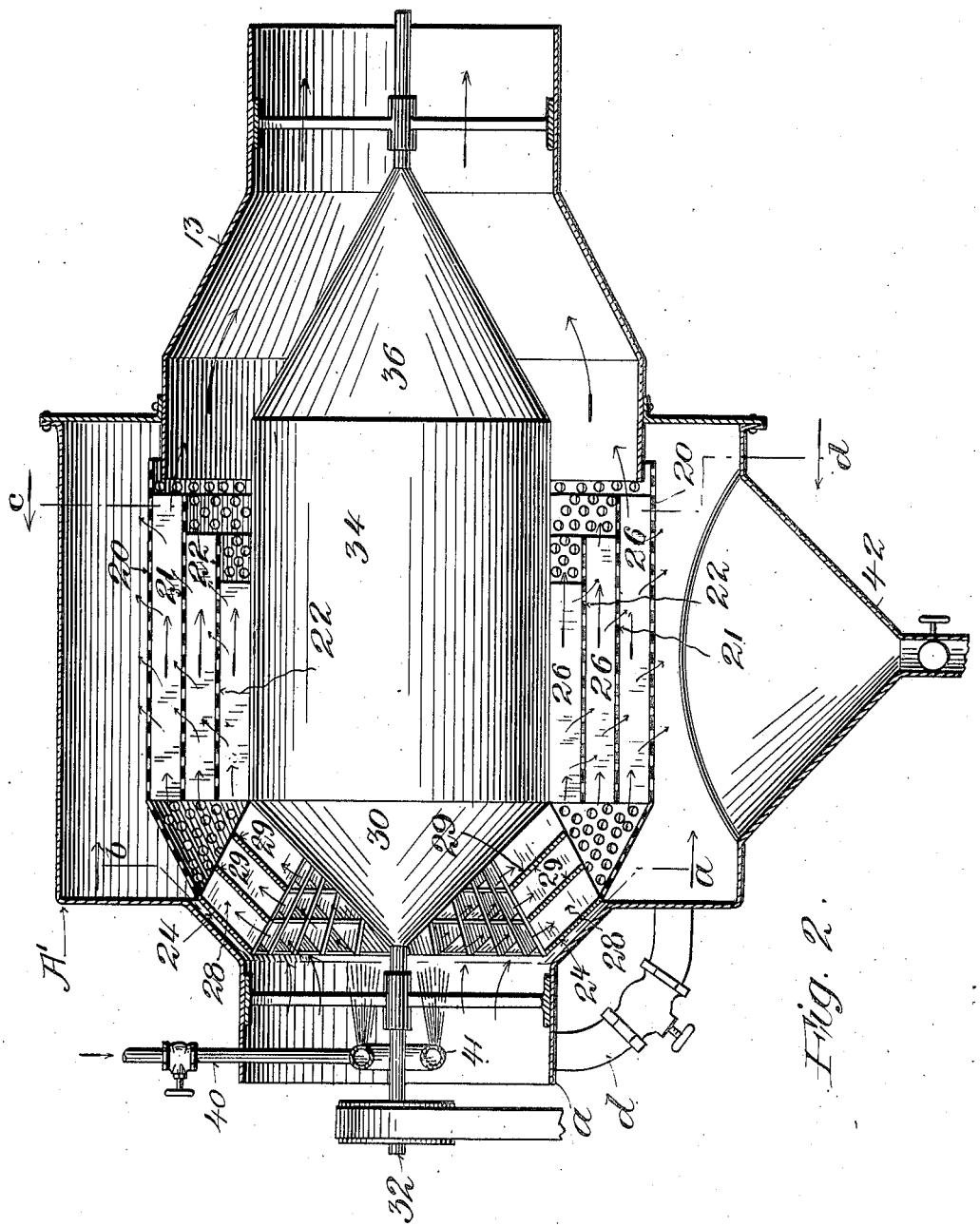

Referring to said drawings, Figure 1 is a longitudinal section, partly broken, of an apparatus in which the construction of the cellular baskets of itself provides the blower action. Fig. 2 is a longitudinal section, partly broken, of an apparatus in which the fan is outside the baskets. Fig. 3 is a cross section on the broken line c—d of Fig. 2. It is also substantially a cross section on the broken line c—d of Fig. 1. Fig. 4 is an elevation of the fan and of Fig. 2, the casing being removed.

Referring to Fig. 1, within a case A provided with suitable inlet a, for gas and material, revolve a plurality of perforated baskets 1, 2 and 3. Any number of baskets may be used, and they are preferably, but not necessarily, concentric and of conical shape. The space between each basket and the adjacent basket or baskets, is divided into cells by ribs or partitions 5. The inner edges of said partitions are secured to the rotary driven shaft 6 and 7, which may be formed hollow and in part of flaring shape as shown, to constitute a filler, the conical portion of the shaft being suitably perforated for the discharge of the fluid into the basket cells. A suitable fluid may be delivered to said shaft 6, 7, by a pipe 9 from any supply suitable packing making a proper joint between said pipe 9 and shaft 6, 7. The fluid supplied to the interior of said shaft will be discharged therefrom by centrifugal force, and into the cells of the baskets, being thrown out through the perforations of one basket into the next, through the perforations of that into the next basket, and so on, until it discharges through the outermost basket into the casing A. The inner end of said shaft 6, 7 is preferably closed, and a filler 12 is arranged preferably adjacent thereto, and in the gaseous discharge 13. Said filler 12 is advantageous in promoting the proper outward flow of gas from the interior of said baskets, and preventing return eddies at the center, and I prefer to contract the outlet end of said discharge 13 to about the area of said inlet $a$; and the machine is preferably so constructed that the gas-flow passages are of approximately the same area from inlet to outlet of the machine.

The addition of suitable fluid to wet the dust or condense the vapors has the great advantage that the finest particles, which, if dry, might get through the machine, are agglomerated by the fluid into particles which are thrown out by the centrifugal force, and the construction with the plurality of baskets, also insures that no dust or body of gas containing dust can pass through the machine without being acted on, as will be hereinafter further explained in connection with the operation of the apparatus. If desired the casing A may be connected from a point outside the baskets to the inlet by a return controlled by a suitable closure. The process is operated by said machine as follows: Gas containing the dust enters by inlet $a$, and passes into the cellular baskets 1, 2 and 3, the conical form of the baskets and shaft 7 and the arrangement of the partitions or blades 5 constituting a centrifugal fan or blower, whereby the gas with the dust is put into rapid rotation, and given a forward direction. Fluid flying out from the orifices of shaft or filler 7, wets or condenses the dust, which flies outwardly through the gas until it meets a basket. The basket imparts additional rotary velocity and centrifugal force to the agglomerates of dust and fluid, and they fly out of the basket orifices into the space between that basket and the next outer basket, receiving further acceleration from the next basket, and so on until they finally fly into casing A, dropping down to the hopper $b$, which is provided with any suitable closure, and being removed as desired. An advantage of the multi-basket form is that greater velocities and greater pressures exist in the outer annular passages of the apparatus, and this can be carried to such an extent, that the slower currents of gas, near the center are relatively retarded and can be so retarded that the gas in held for a longer time near the center of the apparatus and will thus be acted upon for a longer time by the fluid. This is particularly advantageous, because the finer particles, which are the more difficult to separate from the gas, are nearer the center, and the aforesaid retardation retains them for a longer time under the action of the apparatus, and therefore increases the efficiency of their separation. The fluid is also very effectually removed from the gas, being driven out of the gas by the centrifugal force before it can reach the outlet, and therefore the invention not only effects a very efficient separation of dust from gases, but also produces an efficient drying action upon the gas, which is sometimes of great utility, as in ventilation. The gas freed from the material discharges by its proper outlet 13 communicating with the interior of the baskets, and is delivered to any place, or applied to any use, as desired.

Referring to Figs. 2, 3 and 4, the perforated baskets 20, 21 and 22, of which there may be any number, arranged concentrically or otherwise, and of any desired shape, are indicated as having cylindrical bodies, and the outer one (Fig. 2) as having a conical end secured to the shell 24 of the fan. The spaces between each basket and the adjacent basket are divided into "cells" by partitions or ribs 26, the outer partitions being preferably longer than the inner. The preferred construction divides the spaces within said baskets 20, 21 and 22 into spaces which I term "cells", and I prefer to construct the fan with corresponding cells, 29 being partitions between the fan blades 28. The inner ends of said blades 28 are preferably secured to the cone 30, (Fig. 2) fixed on the driving shaft 32. A filler 34 is suitably arranged within the baskets, and I prefer to provide a cone 36 at the outlet end, the cross-sectional area of the inlet and the outlet being preferably approximately equal and also approximately the same as the aggregate cross-sectional area of the cells. The case $A'$, inlet $a$, outlet 13, are substantially the same as corresponding parts in Fig. 1, and the said casing $A'$ may be connected from a point outside the baskets to the inlet by a connection $d$ provided with a closure. A suitable fluid is delivered to this form of machine by a pipe 40, preferably provided with an annular spraying head 41, whereby the fluid is sprayed into the fan and baskets, wetting the surfaces and the dust. Fluid can also be admitted to the baskets by using a hollow filler with perforated wall and delivering the fluid into the filler, whence it will be thrown into the baskets.

It will be clearly understood from the foregoing explanation and description, that the fan imparts rotary motion and forward direction to the gas containing the dust, and forces it into the baskets, that the fluid forms the dust into agglomerates, which are acted on by centrifugal force and thrown out through the orifices of the several baskets, being accelerated by each basket, and being finally discharged into the casing $A'$, falling into the hopper 42, provided with suitable closure, and being removed as desired. The fluid is also thoroughly removed from the gas and the gas dried, as explained in connection with Fig. 1, and the gas from which the dust has been removed discharges by its proper outlet 13.

It will be understood that in all forms of the apparatus, the casing forms a normally closed chamber within which the baskets are located, that the dust passes into the chamber, and that the gas from which the dust is removed passes out by its proper outlet, as hereinbefore explained. In large sizes, the walls of the room in which the apparatus is set up may constitute the casing.

The cellular construction of the baskets can be obtained by fitting a single basket with such material as coke, the interstices between the pieces of coke forming cells, and many materials may be used. The cellular construction may also be produced by using numerous layers of wire mesh or like material one within another. In such case the wire mesh will itself form the plurality of baskets.

The cellular construction is an important feature of my invention, but it is not herein claimed, the said construction being claimed in another application, which is a division of the present application.

Now having described my improvements, I claim as my invention—

1. The process of separating gas and heavier materials, consisting in forcing the gas longitudinally through a hollow perforated rotary cylinder from end to end thereof and out of the end of said cylinder, and forcing the materials substantially radially through the periphery of said perforated cylinder.

2. The process of separating gas and heavier materials, consisting in forcing the gas longitudinally through the spaces between a plurality of hollow perforated rotary cylinders from end to end of said spaces and out of the end of said spaces, and forcing the materials substantially radially through the perforated walls of said cylinders.

3. The process of separating gas and heavier materials, consisting in wetting the materials to form agglomerates, forcing the gas longitudinally through a hollow perforated rotary cylinder from end to end thereof out of the end of said cylinder, and forcing the agglomerates substantially radially through said perforated cylinder.

4. The process of separating gas and heavier materials, consisting in wetting the materials to form agglomerates, forcing the gas longitudinally through the spaces between a plurality of hollow rotating perforated cylinders from end to end thereof and out of the ends of said spaces, and forcing the agglomerates substantially radially through the perforated walls of said cylinders.

5. In apparatus for separating gas and heavier materials, the combination of an outer case, a rotary cylinder therein provided with open ends and with a perforated wall adapted to permit the passage therethrough of said heavier material, and said cylinder having an internal space open from end to end and adapted for the passage of gas therethrough.

6. In apparatus for separating gas and heavier material, the combination of an outer case, a plurality of rotary cylinders therein provided with perforated walls adapted to permit the passage through them of the said heavier material, and said cylinders having annular spaces between them open from end to end and adapted to permit the passage of gas therethrough and out of the ends of said spaces.

7. In apparatus for separating gas and heavier material, the combination of an outer case, a rotary cylinder therein having open ends and a perforated wall adapted to permit the passage therethrough of material, and said cylinder having an internal space opened from end to end and adapted to permit the passage of gas therethrough, and means for supplying fluid to the gas and material.

8. In apparatus for separating gas and heavier material, the combination of an outer case, a plurality of rotary cylinders therein, having perforated walls adapted to permit the passage of said heavier material therethrough, and said cylinders having annular spaces between them open from end to end and adapted to permit the passage of gas therethrough and out of the ends of said spaces, and means for supplying fluid to the gas and material.

Signed at New York city, in the county of New York and State of New York this 31st day of October, A. D. 1910.

WILLIAM J. BALDWIN.

Witnesses:
G. W. HOPKINS,
WALTER N. HARRIS.